United States Patent
Kunert

(10) Patent No.: US 8,919,794 B2
(45) Date of Patent: Dec. 30, 2014

(54) DEVICE FOR SUSPENDING A STEERABLE WHEEL

(71) Applicant: Dr. Ing. h.c. F. Porsche Aktiengesellschaft, Stuttgart (DE)

(72) Inventor: Reinhard Kunert, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 24 days.

(21) Appl. No.: 13/845,216

(22) Filed: Mar. 18, 2013

(65) Prior Publication Data
US 2013/0257006 A1 Oct. 3, 2013

(30) Foreign Application Priority Data
Mar. 27, 2012 (DE) .................. 10 2012 102 630

(51) Int. Cl.
*B60G 21/055* (2006.01)
*B60G 7/00* (2006.01)
*B60G 3/20* (2006.01)
*B60G 7/02* (2006.01)
*B60G 13/00* (2006.01)

(52) U.S. Cl.
CPC *B60G 7/001* (2013.01); *B60G 3/20* (2013.01); *B60G 7/02* (2013.01); *B60G 13/005* (2013.01); *B60G 21/0551* (2013.01); *B60G 2200/144* (2013.01); *B60G 2200/44* (2013.01); *B60G 2204/1224* (2013.01); *B60G 2204/129* (2013.01); *B60G 2204/143* (2013.01)
USPC ........... 280/124.152; 280/124.107; 280/5.511

(58) Field of Classification Search
CPC ............. B60G 21/055; B60G 21/0551; B60G 2200/44; B60G 2204/1224
USPC .................. 280/124.135–124.137, 124.152, 280/124.106, 124.107, 5.511
See application file for complete search history.

(56) References Cited

U.S. PATENT DOCUMENTS 4,883,287 A * 11/1989 Murakami et al. ...... 280/124.135
4,923,209 A * 5/1990 Armbrust et al. ...... 280/124.146

FOREIGN PATENT DOCUMENTS

| DE | 3714688 A1 | 7/1988 |
|---|---|---|
| DE | 4017210 C1 | 10/1991 |
| DE | 4313978 C2 | 4/1999 |
| DE | 10006676 A1 | 11/2000 |
| DE | 102004020073 A1 | 11/2005 |
| DE | 102010047683 A1 | 5/2011 |
| GB | 2244461 A | 12/1991 |
| JP | 07137522 A | 5/1995 |
| JP | 2003118340 A | 4/2003 |

* cited by examiner

*Primary Examiner* — Ruth Ilan
(74) *Attorney, Agent, or Firm* — Leydig, Voit & Mayer, Ltd.

(57) ABSTRACT

A device suspends a steerable wheel on a vehicle via a wheel carrier that is pivotable about a steering axis and on which the wheel is rotatably mounted. The device includes an upper link including a first end and a second end. The upper link is pivotably mounted on the vehicle by the first end and supports the wheel carrier by the second end via a wheel carrier arm. A lower link includes a wheel-side end on which the wheel carrier is pivotably mounted and a vehicle-side end that is pivotably mounted on the vehicle. A stabilizer is pivotably supported in support bearings on the vehicle. The stabilizer includes a free end connected to a coupling rod that extends in a bent manner around a wheel-side region of a spring strut and another end that is mounted on the wheel carrier.

3 Claims, 2 Drawing Sheets

DEVICE FOR SUSPENDING A STEERABLE WHEEL

CROSS REFERENCE TO RELATED APPLICATIONS

This application claims priority to German Patent Application No. DE 10 2012 102 630.0, filed Mar. 27, 2012, which is hereby incorporated by reference herein in its entirety.

FIELD

The present invention relates to a device for suspending a steerable wheel on a vehicle via a wheel carrier which can be pivoted about a steering axis and on which the wheel is rotatably mounted, with an upper link which is pivotably mounted by one of its ends on the vehicle and supports the wheel carrier by its other end, and a lower link on whose wheel-side end the wheel carrier is pivotably mounted and whose vehicle-side end is pivotably mounted on the vehicle, and with a stabilizer rotatably supported about its axis in support bearings on the vehicle.

BACKGROUND

DE 40 17 210 C1 discloses a wheel suspension which is provided with a connecting member which extends substantially vertically and which is articulated at one end on the wheel carrier and at its other end on a rotary arm of a torsion bar stabilizer held on the frame of the vehicle. In the case of this known wheel suspension, the steering axis extends through the upper region of connection of the connecting member with the wheel carrier.

DE 37 14 688 A1 discloses a wheel suspension for steered wheels of vehicles in which a wheel carrier is coupled with suspension arms so as to be pivotable both in its upper and lower regions.

DE 43 13 978 C2 discloses a device for suspending a steerable wheel on a vehicle, which device has a vertically extending first connecting member which is articulated on the wheel carrier, and a second connecting member which extends substantially transversally with respect to the steering direction of the vehicle and which is articulatedly connected to the first connecting member, wherein a spring device counteracts the deflection of the device during pivoting of the wheel carrier.

These devices known from the prior art are intended as far as possible to reduce influences during compression of the steered wheels, for example on uneven roadways, and influences on the restoring moment of the steering device at different driving speeds.

SUMMARY

In an embodiment, the present invention provides a device that suspends a steerable wheel on a vehicle via a wheel carrier that is pivotable about a steering axis and on which the wheel is rotatably mounted. The device includes an upper link including a first end and a second end. The upper link is pivotably mounted on the vehicle by the first end and supports the wheel carrier by the second end via a wheel carrier arm. A lower link includes a wheel-side end on which the wheel carrier is pivotably mounted and a vehicle-side end that is pivotably mounted on the vehicle. A stabilizer is pivotably supported in support bearings on the vehicle. The stabilizer includes a free end connected to a coupling rod that extends in a bent manner around a wheel-side region of a spring strut and another end that is mounted on the wheel carrier.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

An aspect of the present invention is to provide a suspension device for a steered wheel with which influences during the compression of the steered wheels, for example during cornering or on uneven roads during straight-ahead driving, can be still further reduced. The invention also provides a weight reduction of the suspension parts while at the same time reducing the forces and moments to be transmitted in the wheel suspension.

According to the invention, this is achieved in that the end of the stabilizer is connected to a coupling rod which extends in a bent manner around the wheel-side region of the spring strut and whose other end is mounted on the wheel carrier.

In an alternative solution, the end of the stabilizer which is articulated on the link can be connected to a coupling rod which extends in a bent manner around the wheel-side region of the spring strut and whose other end is mounted in the upper region of the wheel carrier.

The couple rod end here can be mounted on the wheel carrier by means of an axial bearing (for example with rubber element) in an approximately horizontally angled-off region of the wheel carrier arm.

In an expedient manner, the other coupling rod end can be mounted on the stabilizer via an axial bearing (for example with rubber element).

In the alternative embodiment, the second coupling rod end can be mounted on the stabilizer via a rubber bearing suitable for absorbing torsion forces.

With this special coupling rod detachment directly to the steered wheel carrier in the kinematically particularly favorable regions—alternative 1: just above the wheel bearing in an angled-off region of the wheel carrier arm—alternative 2: directly in the region of the articulation of the wheel carrier arm to the upper link—it is possible given a corresponding design of stabilizer or coupling rod and the corresponding articulation points to achieve a situation in which it is possible to achieve a large compensation of the elastic toe-in (understeer) of the wheel on the outside of the bend during spring compression on alternate sides when entering the bend. Furthermore, it is possible to largely reduce disruptive moments on the steering wheel during spring compression on alternate sides, for example during straight-ahead driving on uneven roads. With a corresponding choice of the stabilizer and its transmission ratio, the forces and moments occurring in the wheel suspension, for example also drive-side forces and moments, can be considerably reduced.

Figure 1:
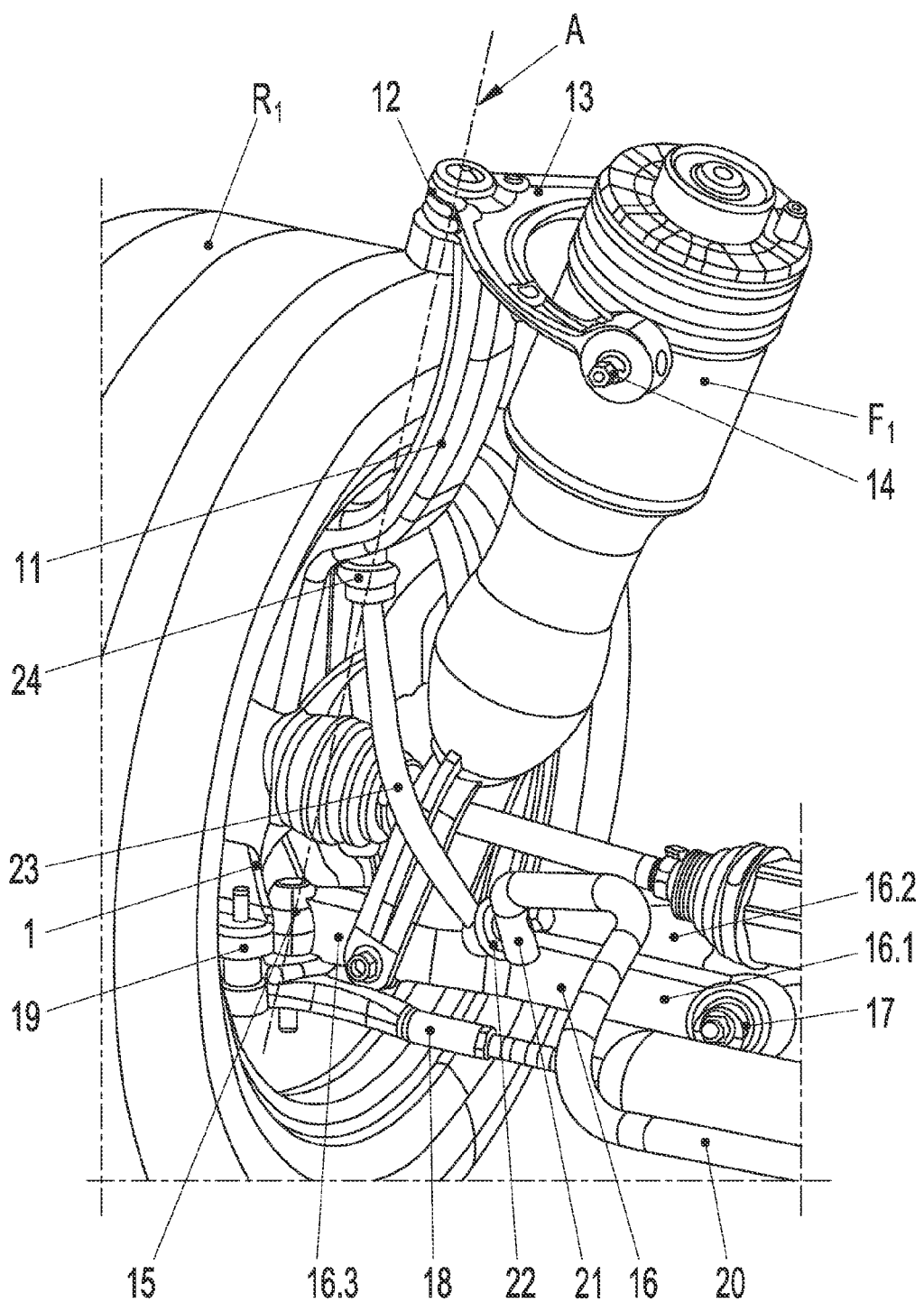
FIG. 1 shows a first design variant of a wheel suspension for a steerable front axle according to the invention.

In FIG. 1, R1 denotes a steerable wheel of a vehicle. The wheel R1 is rotatably mounted on a wheel carrier 1. The wheel carrier 1 is mounted on an upper link 13 via a wheel carrier arm 11 by means of an axial rubber bearing 12. The upper link 13 is mounted via pivot bearings 14 so as to engage around the vehicle-side end of spring strut F1 in the form of a fork. The spring strut F1 in turn is directly fastened to the forward structure of the vehicle.

The wheel carrier 1 is fastened below the wheel center point of the wheel R1 to a likewise fork-shaped lower link 16 via a pivot bearing 15, which link is articulated by its two fork ends 16.1 and 16.2 in substantially horizontally articulated pivot bearings 17 on the vehicle.

The steering movement of the wheel R1 is initiated via the track rod 18 which is articulated on a track rod arm 19 on the wheel carrier 1.

A stabilizer 20 which is axially rotatably mounted on support bearings (not shown in the drawing) fixed to the vehicle body is anchored on the wheel-side end 16.3 of the lower link 16. On its angled-off end 21 there is articulated a coupling rod 23 by means of an axial bearing 22 equipped with a rubber element. The axial bearing 22 with its rubber elements allows the coupling rod 23 to make rotational movements only in a considerably reduced region. The coupling rod 23 itself has a bent design in the direction of the inside of the wheel, with the result that it can be arranged in a disruption-free manner around the wheel-side region of the spring strut F1 even during compression and during pivoting of the wheel R1. With its upper free end, the coupling rod 23 is fixed in the upper region of the wheel carrier arm 11 via an axial bearing 24 with rubber element. Here, the wheel carrier arm 11 extends in the region of the engagement point of the coupling rod 23 so as to be angled off between about 45° to a maximum of 90° over a relative short region. Ideally, the engagement point (bearing 24) for the coupling rod 23 on the wheel carrier arm 11 is situated on the steering inclination axis A, with the result that during compression a moment directed in the toe-out direction is exerted around the steering axis (connection line connecting axle bearing center 12 of link 13 and bearing center 15 of lower transverse link 16.3 on the wheel carrier 1).

Figure 2:
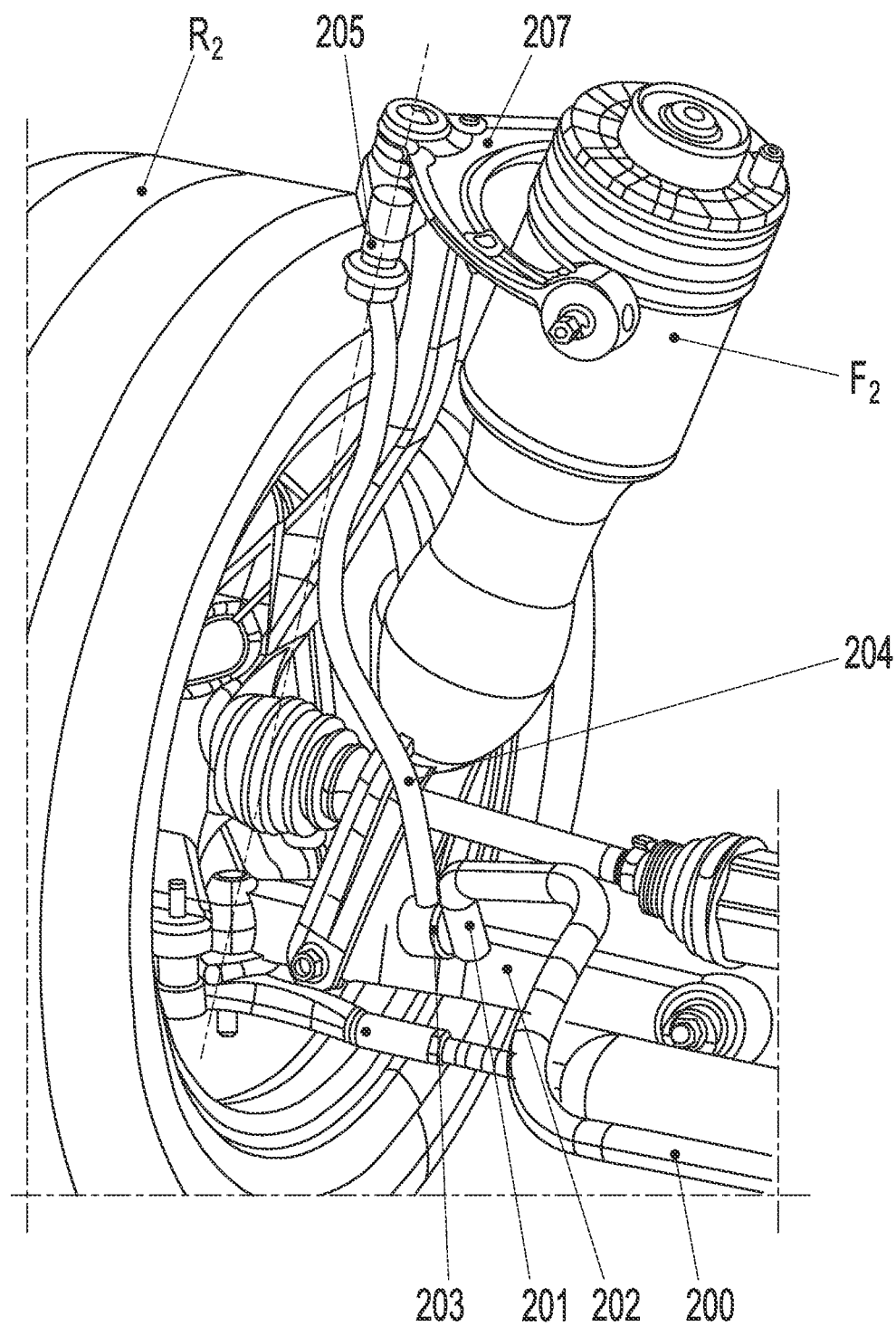
FIG. 2 shows a second embodiment of a wheel suspension for a steerable front axle according to the invention.

An alternative embodiment of the solution according to the invention is represented in FIG. 2. Only the elements of the invention which differ from the exemplary embodiment according to FIG. 1 will be described and designated in more detail below.

The stabilizer 200 is again fastened by its angled-off end 201 to the lower fork-shaped link 202. A coupling rod 204 is fixed to the stabilizer end 201 via an axial bearing 203 which permits rotations only to a limited extent.

The other free end of the coupling rod 204 is likewise articulated via an axial joint 205 on an attachment 206 of the upper link 207 (design and articulation as upper link 13 in the example according to FIG. 1). The coupling rod 204 extends in a bent manner around the lower region of the spring strut F2 and likewise around the wheel carrier arm articulated on the upper link 207 via a bearing, in order not to act in a disruptive manner either during compression or during steering movements.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A device for suspending a steerable wheel on a vehicle via a wheel carrier that is pivotable about a steering axis and on which the wheel is rotatably mounted, the device comprising:
    an upper link including a first end and a second end, the upper link being pivotably mounted on the vehicle by the first end and supporting the wheel carrier by the second end via a wheel carrier arm;
    a lower link including a wheel-side end on which the wheel carrier is pivotably mounted and a vehicle-side end that is pivotably mounted on the vehicle;
    a stabilizer that is pivotably supported in support bearings on the vehicle; and
    a rod including an end connected to the stabilizer and another end that is mounted on an upper region of the wheel carrier at an attachment of the upper link, the coupling rod extending in a bent manner around a wheel-side region of a spring strut and the wheel carrier arm.

2. The device for suspending a steerable wheel as recited in claim 1, wherein the end of the coupling rod connected to the stabilizer is mounted via an axial bearing on the stabilizer in a fastening region on the lower link.

3. The device for suspending a steerable wheel as recited in claim 1, wherein the end of the coupling rod connected to the stabilizer is mounted via a rubber bearing, suitable for absorbing torsion forces, on the stabilizer in a fastening region on the lower link.

* * * * *